Sept. 23, 1924.

E. CRAIG 1,509,191

MACHINE FOR MAKING ICE CREAM PAILS OR OTHER RECEPTACLES

Filed April 23, 1920   13 Sheets-Sheet 1

Inventor
Edward Craig
By Arthur R. Durans
Atty.

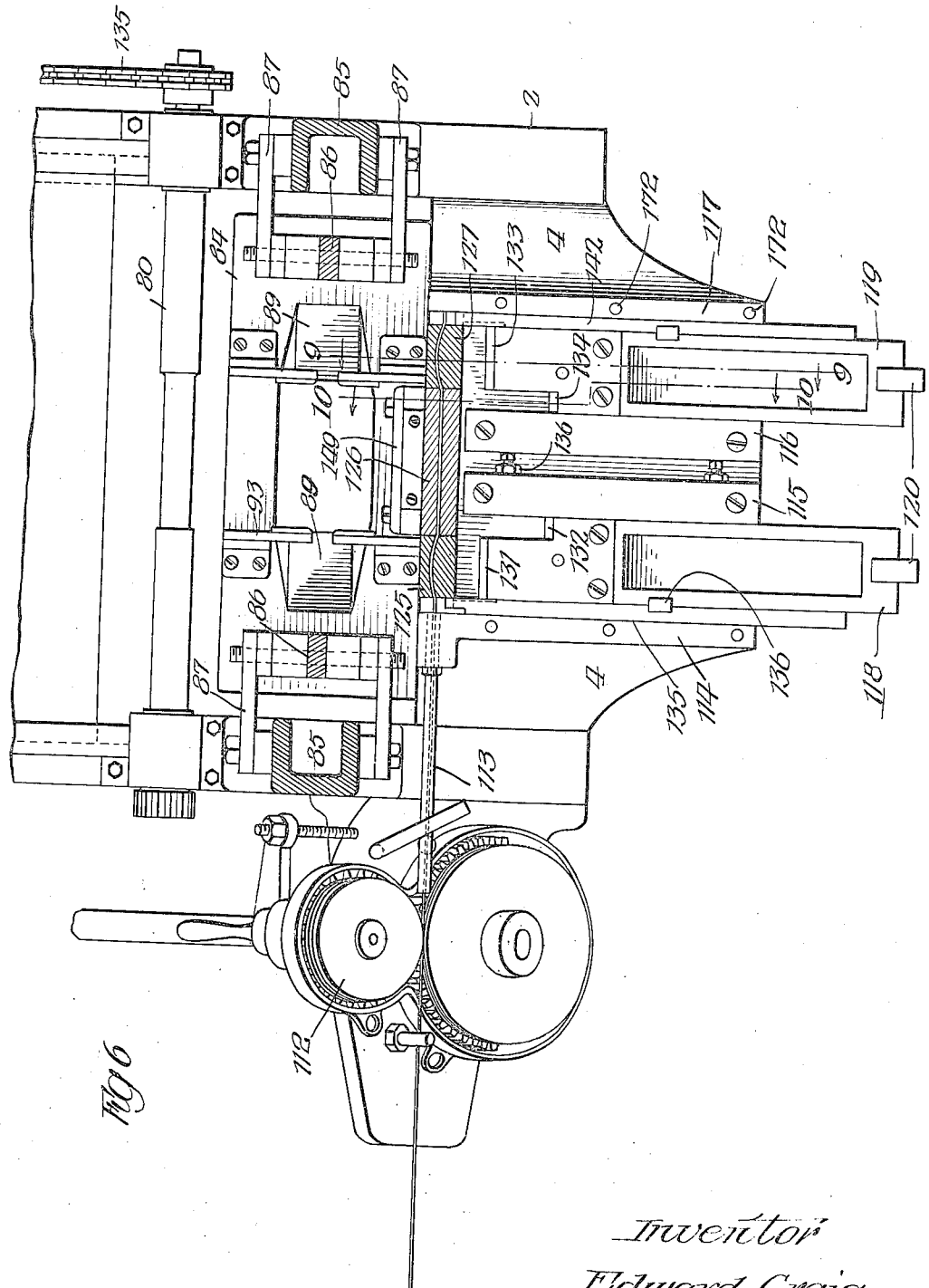

Sept. 23, 1924.  
E. CRAIG  
1,509,191  
MACHINE FOR MAKING ICE CREAM PAILS OR OTHER RECEPTACLES  
Filed April 23, 1920  13 Sheets-Sheet 7
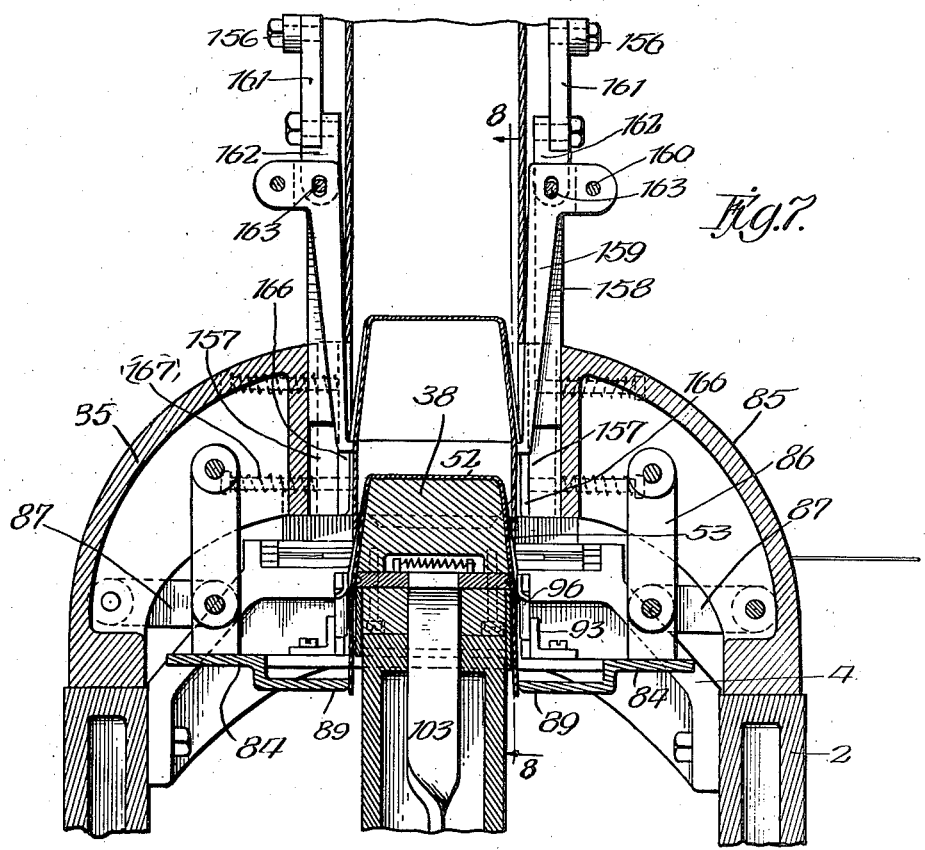
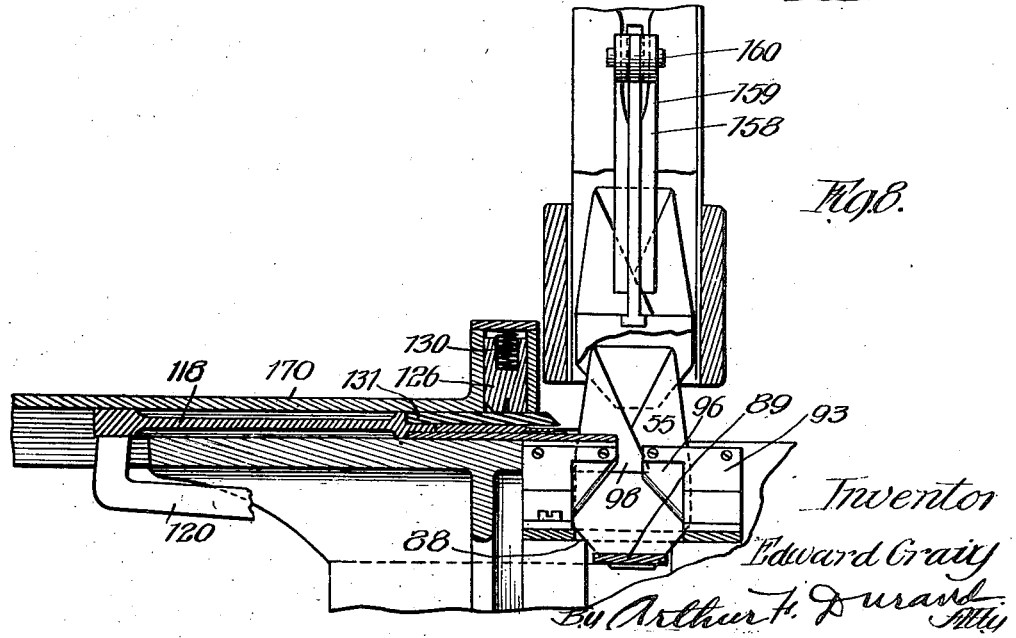

Sept. 23, 1924.
E. CRAIG
1,509,191
MACHINE FOR MAKING ICE CREAM PAILS OR OTHER RECEPTACLES
Filed April 23, 1920    13 Sheets-Sheet 8
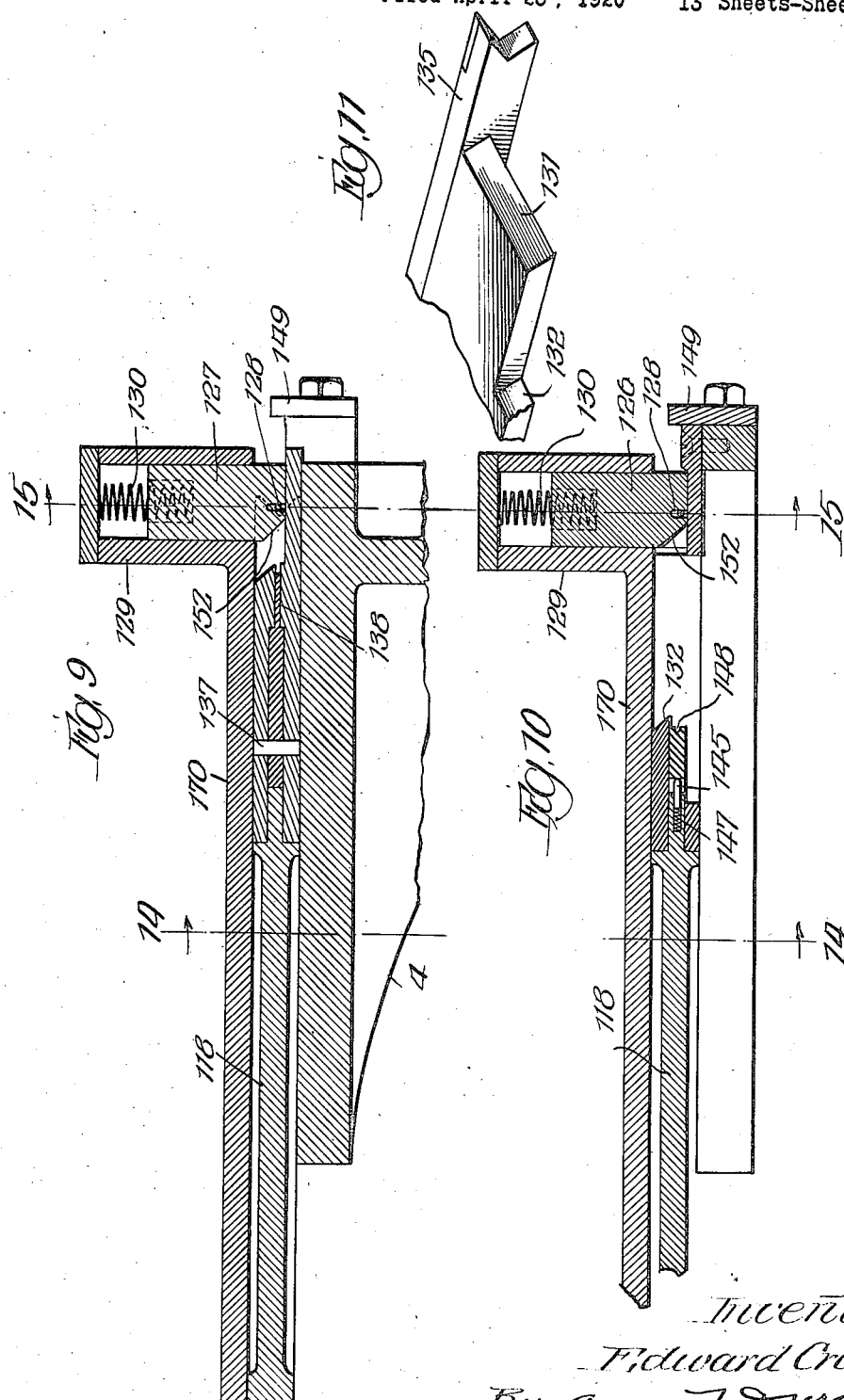

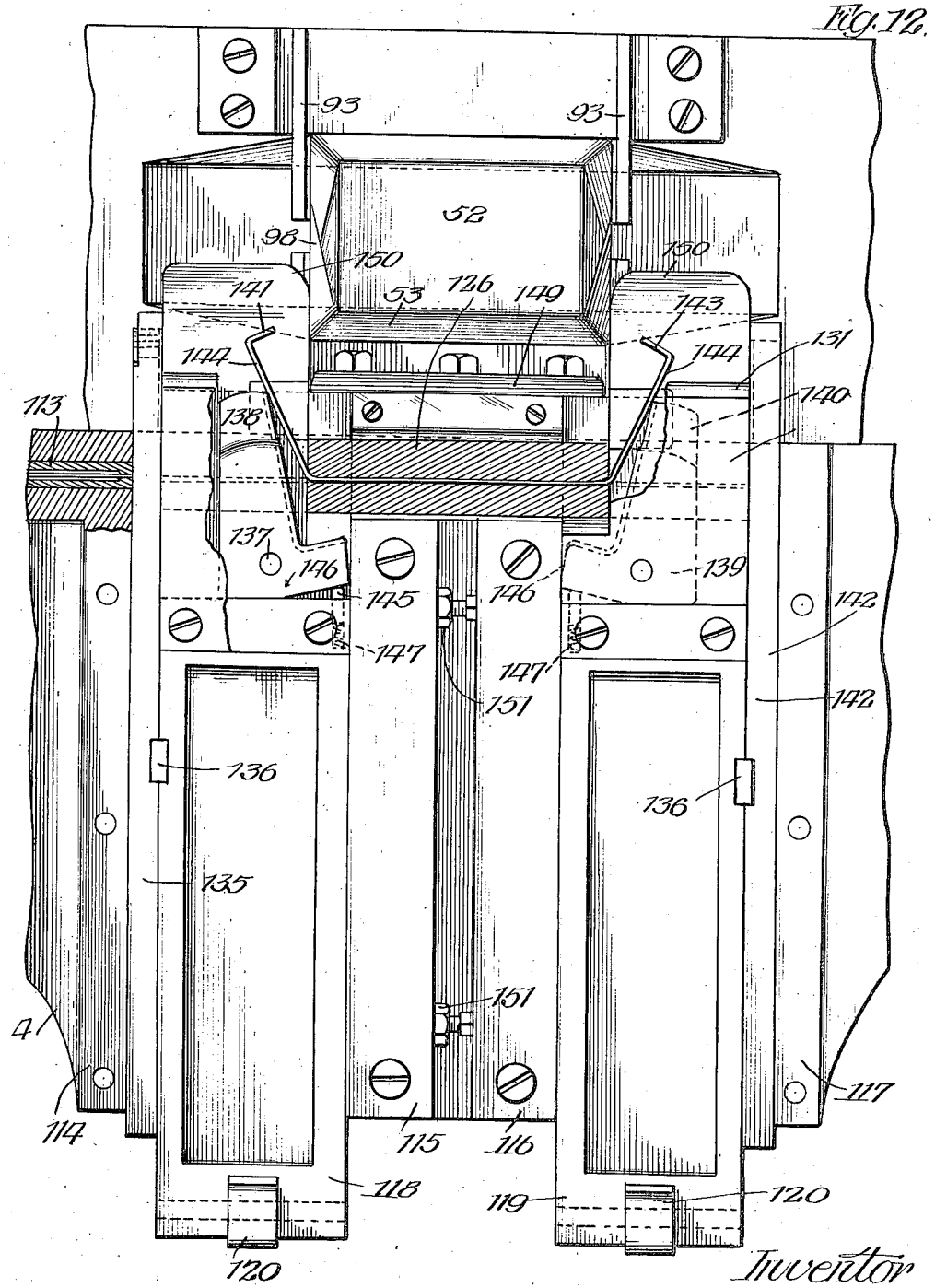

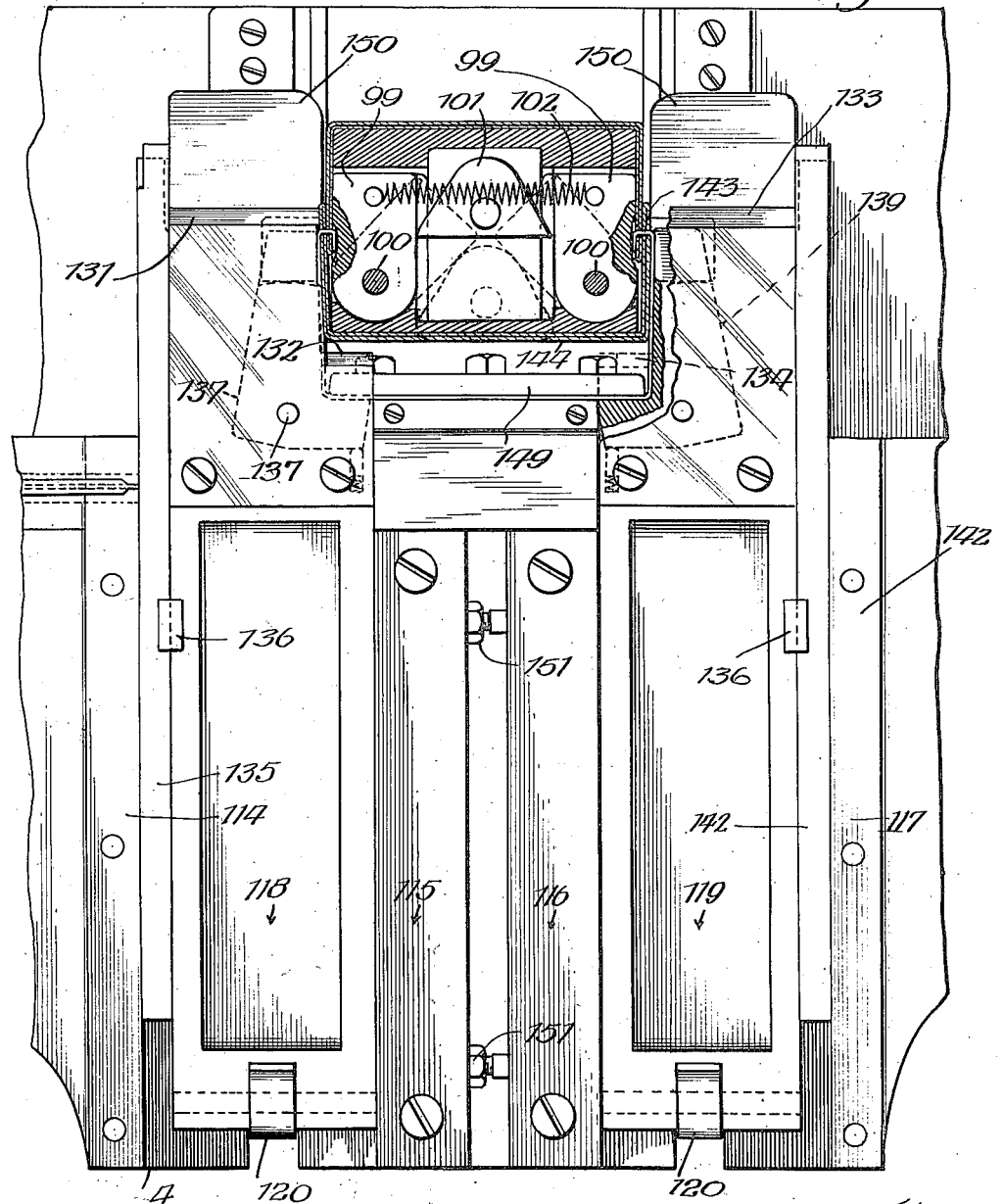

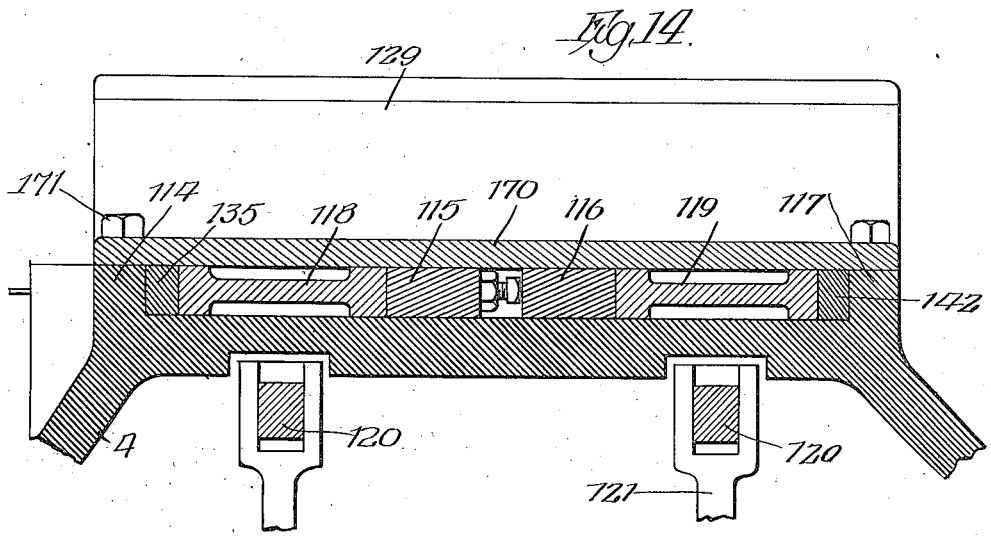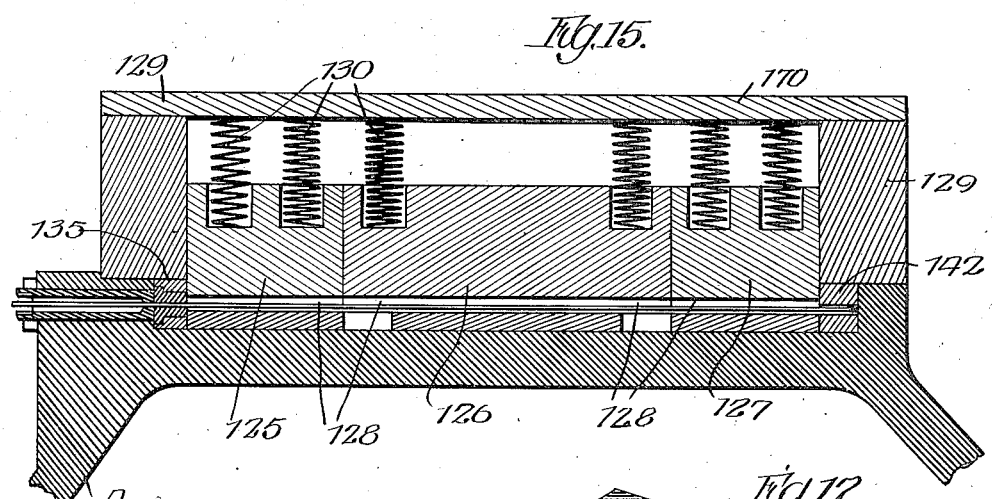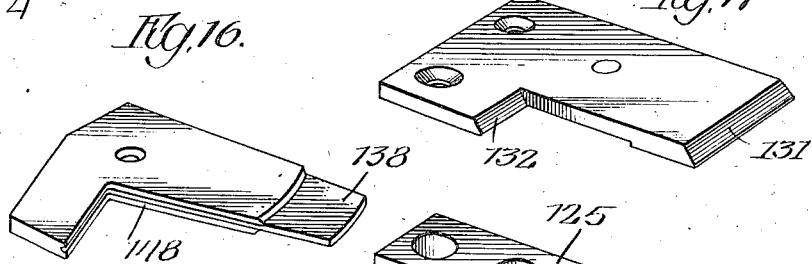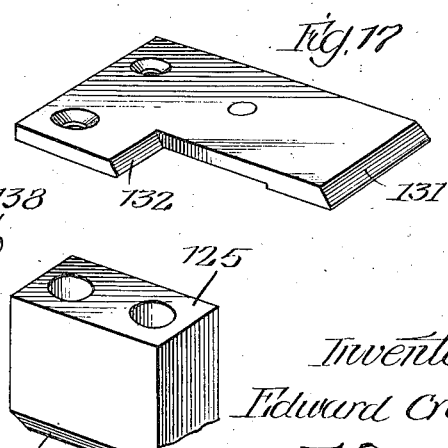

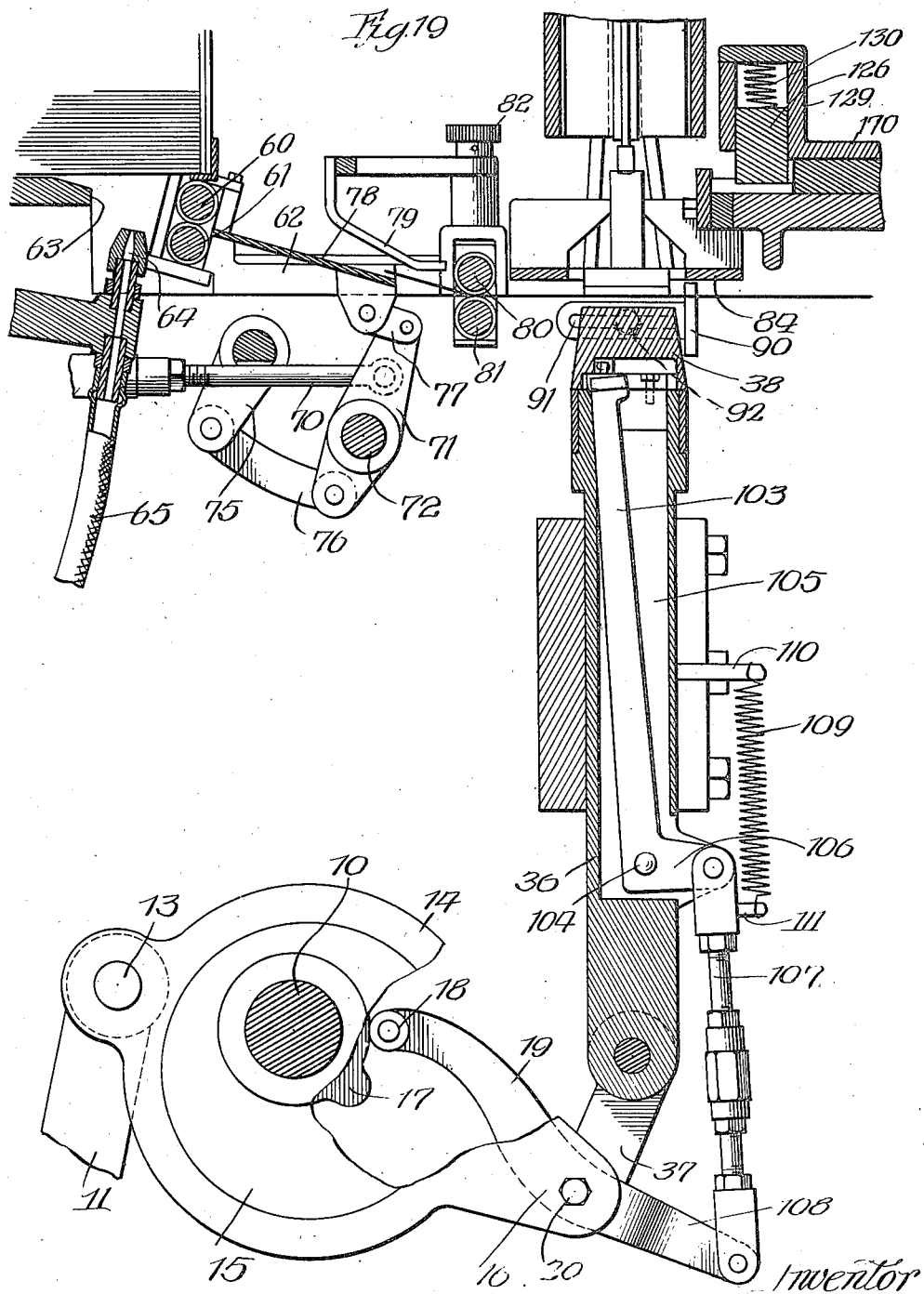

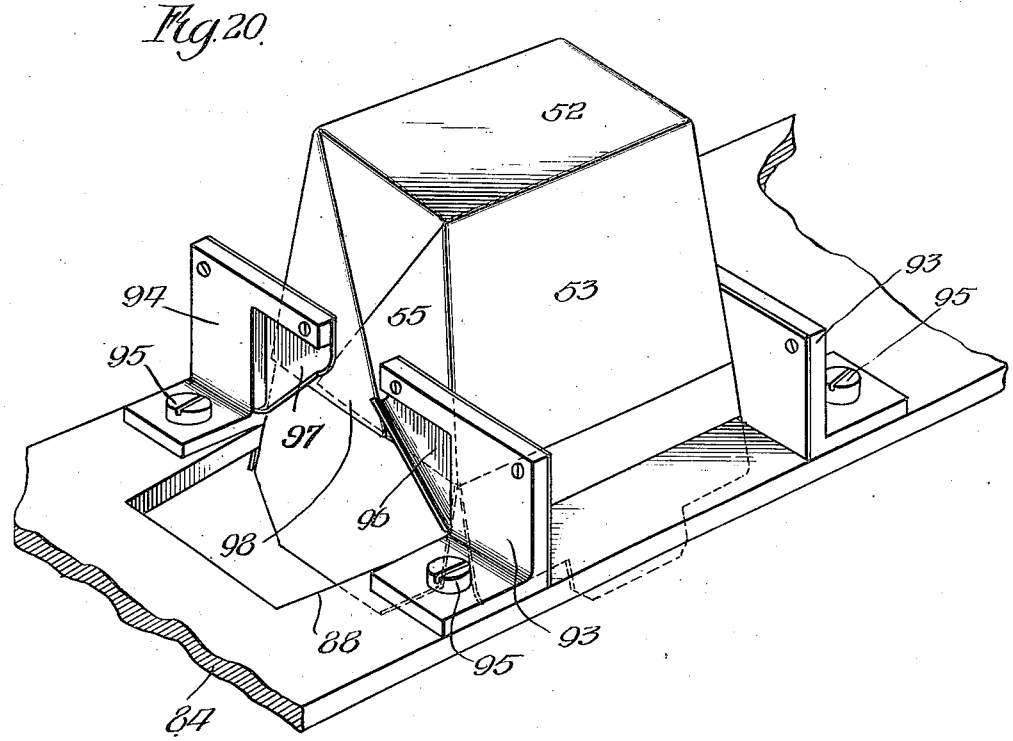
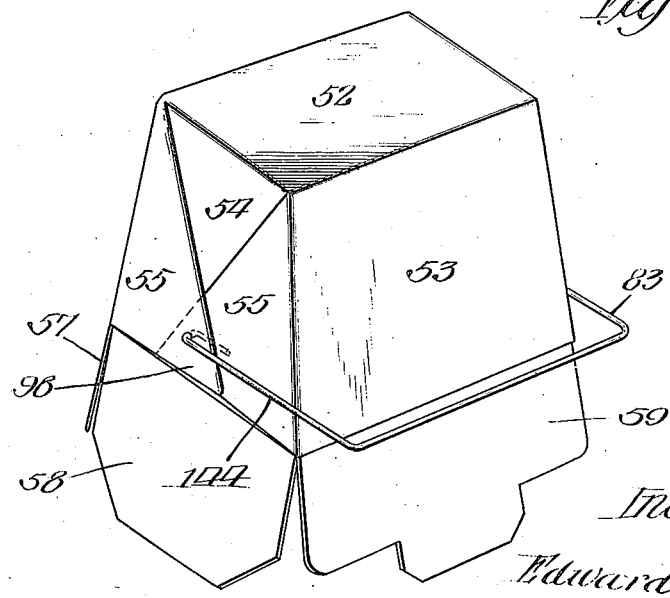

Patented Sept. 23, 1924.

1,509,191

UNITED STATES PATENT OFFICE.

EDWARD CRAIG, OF ST. JOSEPH, MICHIGAN.

MACHINE FOR MAKING ICE-CREAM PAILS OR OTHER RECEPTACLES.

Application filed April 23, 1920. Serial No. 376,161.

*To all whom it may concern:*

Be it known that I, EDWARD CRAIG, a citizen of the United States of America, and a resident of St. Joseph, Michigan, have invented a certain new and useful Improvement in Machines for Making Ice-Cream Pails or Other Receptacles, of which the following is a specification.

This invention relates to machines for making paper ice-cream pails, or other similar receptacles. In this particular case, the pail is made by folding a single paper blank into the desired shape, so that a four-sided receptacle is provided having four flaps at the top thereof, and by then inserting the ends of a bail-shaped handle through overlapping portions of the sheet material at opposite sides of the pail, whereby the wire bail serves not only as a handle by which to carry the pail, but also as the means for retaining the sheet material in folded condition, thus obviating the necessity of any additional fastening devices.

Generally stated, therefore, the object of the invention is to provide a novel and improved construction and arrangement whereby sheet material, such as paper or pulp board or other similar material of the proper thickness, will be automatically folded into the desired shape, and whereby the bail-shaped wire handles will be automatically applied to the receptacles thus formed, in a rapid and accurate and reliable manner, with a view to materially reducing the cost of production of said receptacles, or similar receptacles, and at the same time assuring the requisite high degree of quality for said receptacles.

It is also an object to provide certain details and features of construction and combinations tending to increase the general efficiency and the desirability of an automatic machine of this particular character for making ice-cream pails, or for making similar receptacles.

To these and other useful ends the invention consists in matters hereinafter set forth and claimed.

In the accompanying drawings—

Fig. 6 is a horizontal section, on a larger scale, on line 6—6 in Fig. 3, showing certain portions of the machine broken away for convenience of illustration.

Fig. 7 is an enlarged vertical section on line 7—7 in Fig. 4.

Fig. 8 is a vertical section on line 8—8 in Fig. 7.

Fig. 9 is a detail section, on a larger scale, on line 9—9 in Fig. 6.

Fig. 10 is a similar section on line 10—10 in Fig. 6.

Fig. 11 is a perspective of one of the formers (the one which cuts the wire) employed in cutting off and reducing the wire to bail shape, so that the ends of the bail may then be bent around and inserted through the sides of the receptacle and clinched on the inner surfaces of the sheet material.

Fig. 12 is a plan view of the mechanism for making the bail-shaped wire handles, on the same scale as Figs. 9 and 10, being a horizontal section on a line coincident with the plane of the wire handle, which latter is shown in condition to be applied to the receptacle.

Fig. 13 is a view similar to Fig. 12, but showing the parts in different positions, and showing the receptacle formed in horizontal section, thereby to illustrate the operation of inserting the ends of the wire through the sides of the receptacle and clinching the same in the manner necessary to hold the bail-shaped handle in place, and for the purpose of retaining the sheet material in folded condition.

Fig. 14 is a vertical section on line 14—14 in Figs. 9 and 10.

Fig. 15 is a vertical section on line 15—15 in Figs. 9 and 10.

Fig. 16 is a perspective of one of the bell-crank-shaped folders by which the wire is bent and forced through the sides of the receptacle.

Fig. 17 is a perspective of one of the cam plates constituting a part of the mechanism for folding and inserting the ends of the bail-shaped handle.

Fig. 18 is a perspective of one of the vertically reciprocating blocks forming a part of said mechanism.

Figure 3:
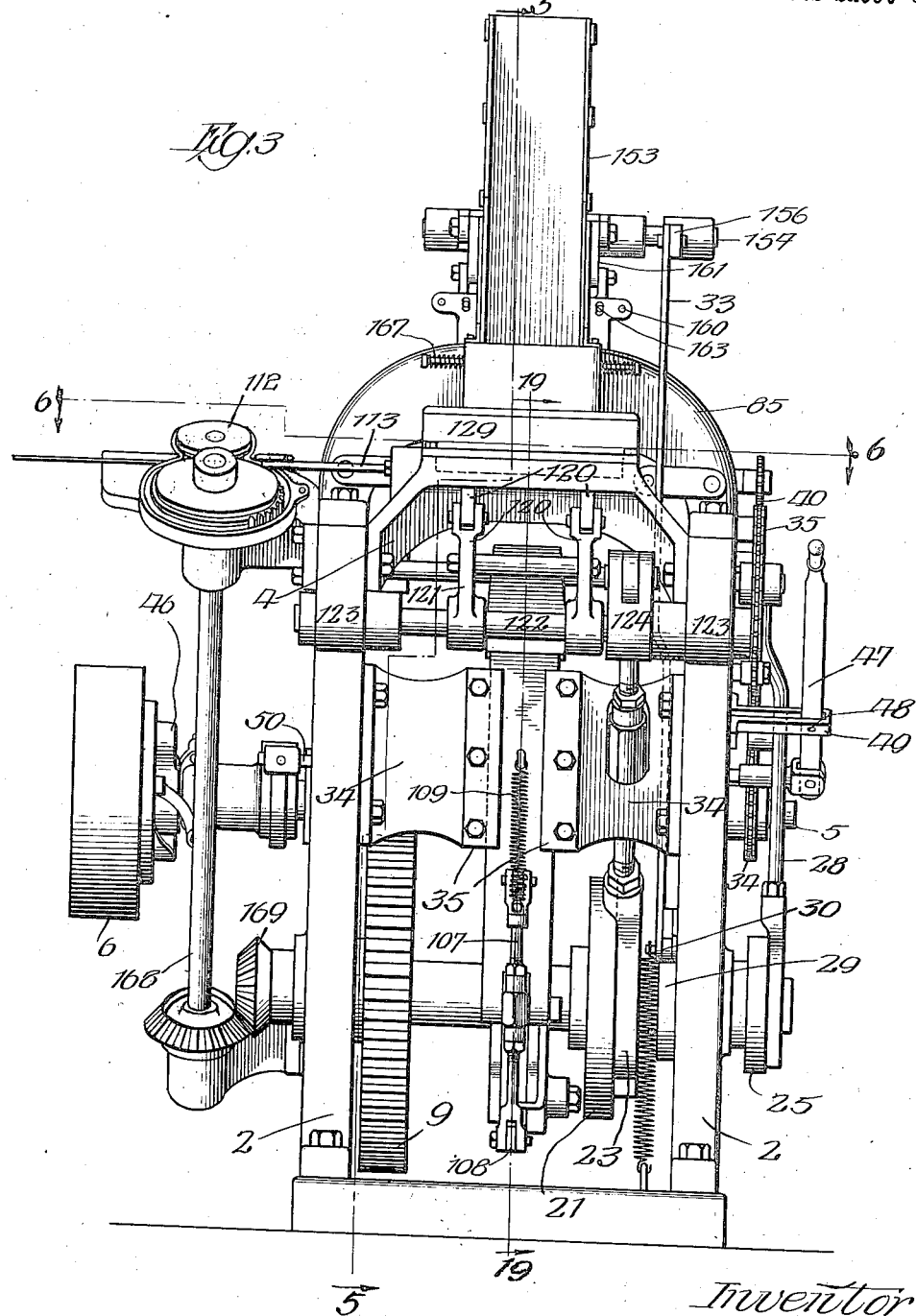
Fig. 3 is a front elevation of said machine.
Figure 5:
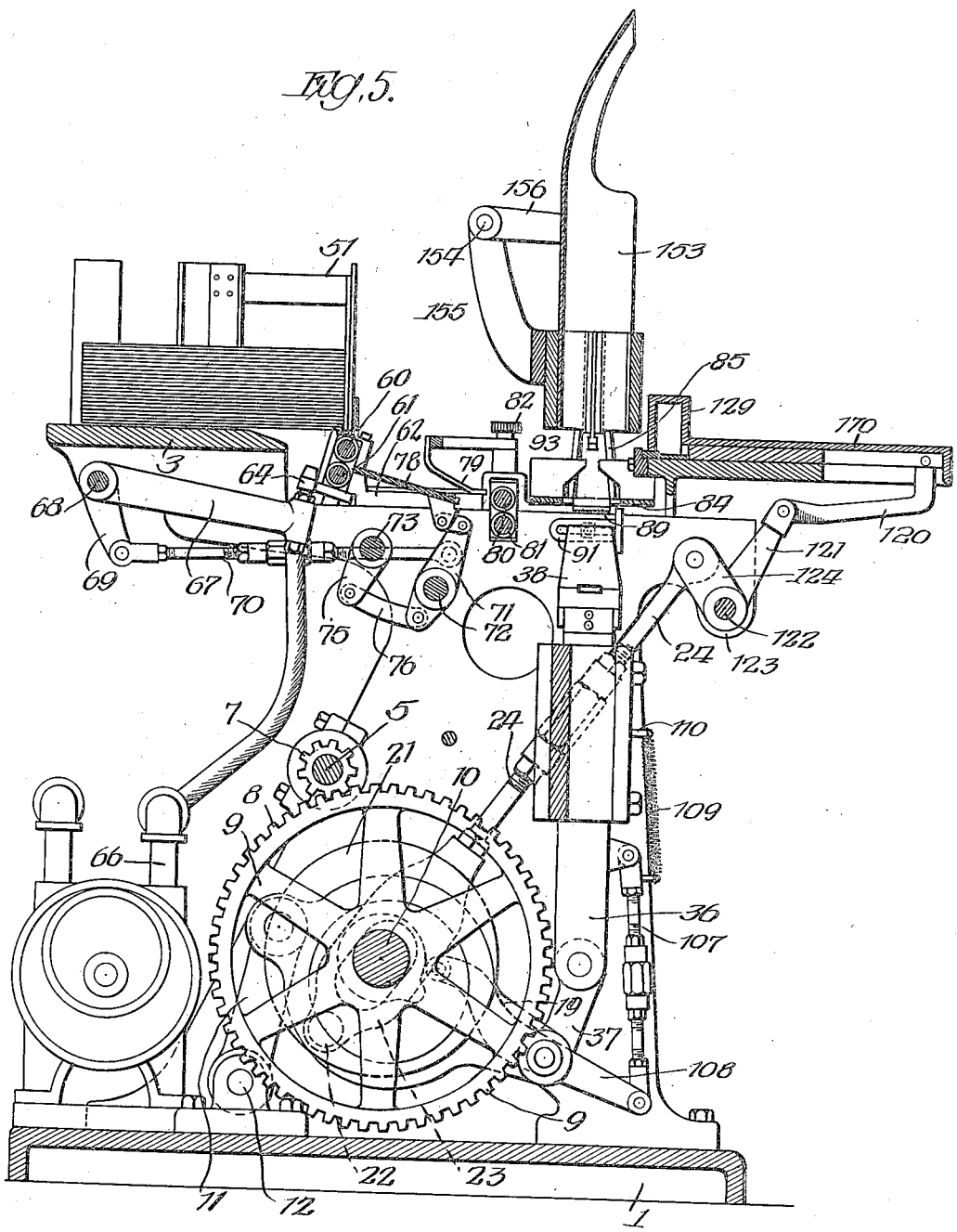
Fig. 5 is a vertical section on line 5—5 in Fig. 3.

Fig. 19 is an enlarged sectional view showing certain elements shown in Fig. 5, on a larger scale, being a section on line 19—19 in Fig. 3.

Fig. 20 is a perspective of one of the ice-cream pails, before the handle is applied thereto, showing adjacent portions of the machine in perspective, it being understood that the pail or receptacle is formed in an upside down position.

Fig. 21 is a perspective of said pail or receptacle, with the bail-shaped handle applied thereto, showing the finished product.

As thus illustrated, the machine comprises preferably, a base 1 upon which are mounted two oppositely disposed and parallel upright castings or side frames 2 bolted thereto at their lower ends. A feeding table 3 is suitably bolted to the tops of said side frames or castings 2, at the rear end of the machine, and at the front of the machine the two castings or side frames are connected together by a transverse casting 4 that forms a table for the mechanism by which the wire handles are formed and inserted through the sides of the receptacles. The machine is provided with a main drive shaft 5 on the outer end of which is a driving pulley 6, and upon an inner portion of which is a pinion 7 that engages the teeth 8 of the gear wheel 9 on the countershaft 10, both of said shafts being mounted on suitable bearings on the said side frames of the machine. A link 11 is pivoted at 12 upon the base of the machine and has its upper end pivoted at 13 to one end of the eccentric strap 14, which latter is mounted upon the eccentric cam 15 which is keyed or otherwise secured to the shaft 10, whereby rotation of said cam causes its end portion 16 to move up and down. Said shaft 10 is also provided with a smaller cam 17 for engaging the roller 18 carried on the lever 19, which latter is pivoted at 20 on the end portion 16 of said eccentric cam strap. A third cam 21 is secured upon the shaft 10 and provided with a cam groove for engaging the roller 22 on the yoke 23, which latter is slotted to slide on the shaft 10, so that the rod 24 which is rigid with said yoke is reciprocated endwise. A fourth cam 25 is secured to the outer end of the shaft 10 and formed with a cam groove to engage the roller 26 of the yoke 27, which latter is also slotted to slide on the outer end portion of the shaft 10, whereby the rod 28 which is rigid with said yoke 27 is reciprocated endwise. A fifth cam 29 is secured to the shaft 10 and arranged to engage the roller 30 on the horizontally disposed leved 31, which latter is pivoted at 32 on one of the side frames of the machine, and pivotally connected at its other end with the vertically disposed rod or connecting member 33, whereby the latter is reciprocated up and down endwise. It will be understood that all of said cams may be of any suitable, known or approved form, so that the said instrumentalities operated thereby will have the desired movements and will all operate at the proper time, as will hereinafter more fully appear.

Figure 2:
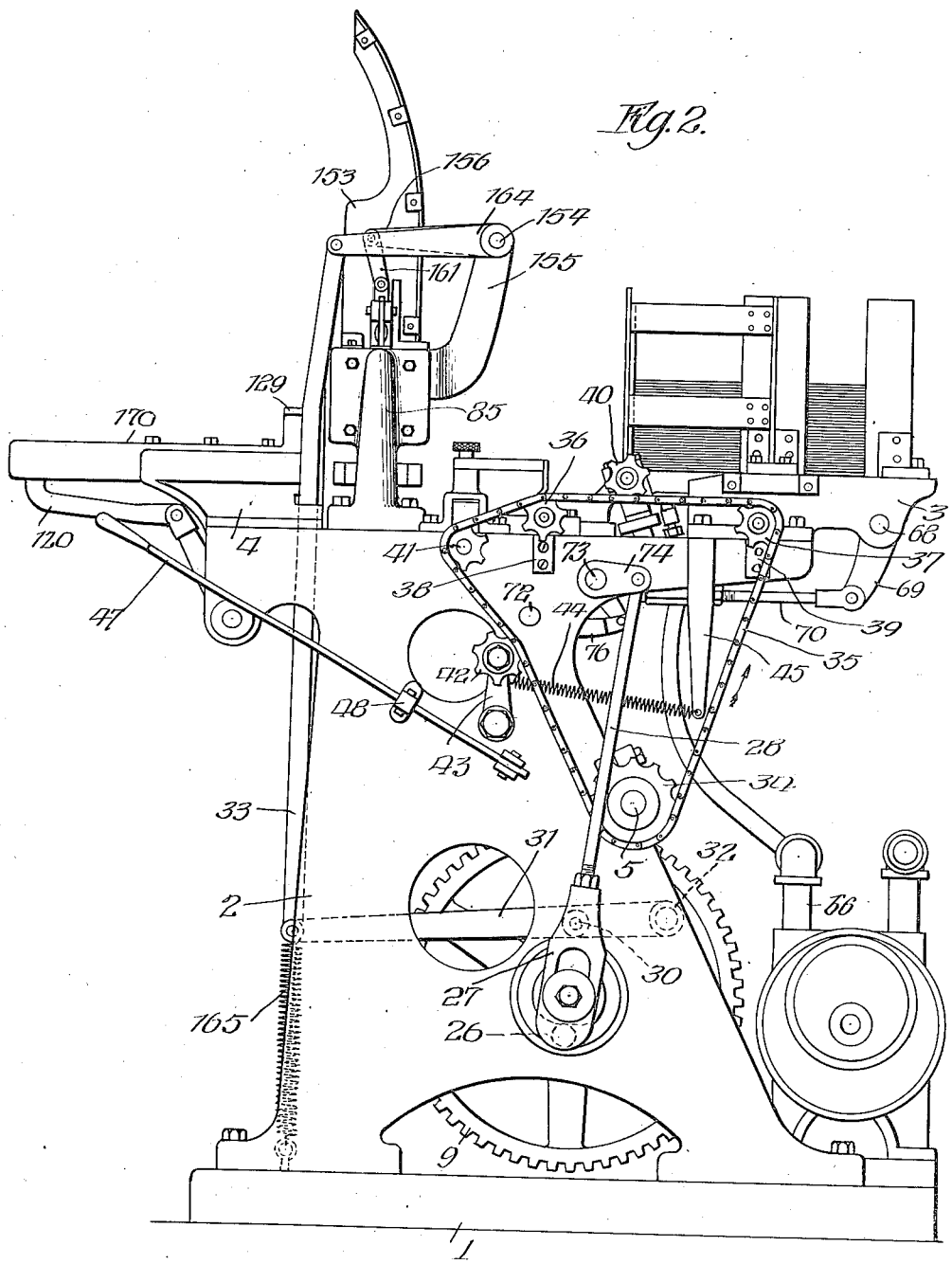
Fig. 2 is a similar view showing the other side of said machine.

The shaft 5 has one end thereof provided with a sprocket wheel 34 which drives the sprocket chain 35, in the direction indicated by the arrow in Fig. 2, said sprocket chain being supported by the idlers 36 and 37 suitably supported by brackets 38 and 39 secured to the upper edge portion of one of the side portions of the machine. A sprocket wheel 40 engages the upper horizontal stretch of the sprocket chain 35, as shown in Fig. 2, and a sprocket wheel 41 engages the said sprocket chain at another point, these two sprocket wheels being employed for driving said elements of the feed mechanism, as will hereinafter more fully appear. A belt tightener 42 also engages said sprocket chain 35, being mounted on a pivoted arm 43 which is subject to the pull of the coil spring 44, the latter being hitched to the lower end of a stationary bracket 45 secured to one side of the body frame. The transmission of power from the pulley 6 to the shaft 5 is preferably controlled by a clutch mechanism 46 of any suitable, known or approved character, and this clutch is controlled by a hand lever 47 which is fulcrumed at 48 upon a bracket 49 at the other side of the machine; said hand lever being connected by a rod 50 with the said clutch mechanism, whereby the operator can start and stop the machine at will.

Figure 4:
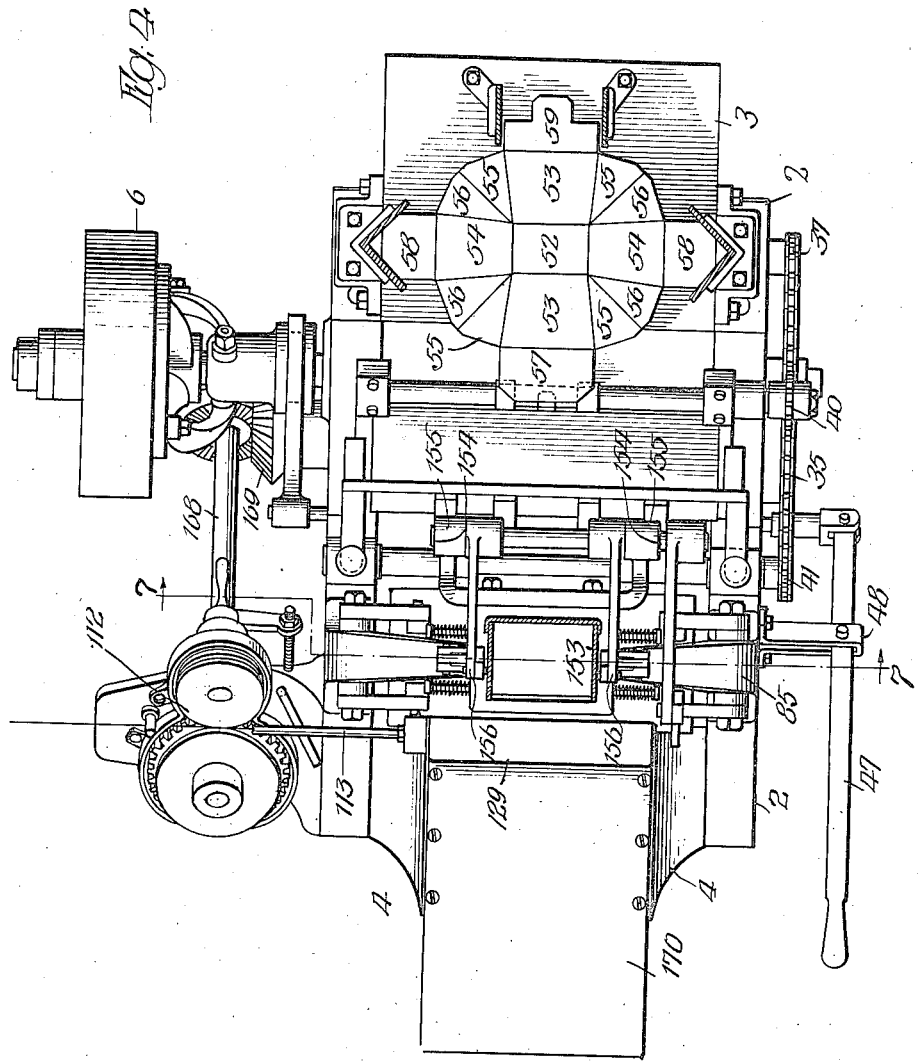
Fig. 4 is a plan of said machine.

The feed mechanism for feeding the blanks from which the receptacles are made is as follows: A hopper 51 is mounted on the table 3, and is constructed to hold the blanks one above the other, or in superimposed condition. Each blank, is shown in Fig. 4, comprises a rectangular section 52 which ultimately forms the bottom of the receptacle, side sections 53, end sections 54, and corner or flap sections 55 and 56, together with cover flaps 57, 58 and 59, so that the blank when folded will form a receptacle of the character shown in Figs. 20 and 21, as will hereinafter be more fully explained. With the blanks thus shaped, the said hopper is formed to engage the flaps 58 and 59, to hold the blanks in proper position for delivery to the instrumentalities by which the blanks are fed forward one by one, from the under side of the stack, by the feed rolls 60 and 61, the latter being shown more clearly in Figs. 5 and 19, which latter are mounted upon the reciprocating slide 62 that operates back and forth in a horizontal plane on the tops of the side frames of the machine. The upper feed roll 60 is operated by the sprocket wheel 40, which latter is rotated in the desired direction by the sprocket chain 35 previously mentioned. The lowermost blank of the stack is pulled downwardly in front of the forward edge 63 of the table 3, by the suction nozzle 64, which latter is connected by a pipe or flexible tube 65 with the exhaust pump 66, the latter being of any suitable, known or approved form. Said nozzle 64 is carried on an arm 67 which is pivoted below the table 3 at 68, being rigid with an arm 69, the two arms forming a bell crank. The lower end of the arm 69 is connected by a rod 70 with a short lever 71, which is mounted on the rock shaft 72 suitably supported in bearings on the body frame. A rock shaft 73 is connected by a crank arm 74 with the pitman 28 previously mentioned, and said shaft 73 has a crank arm 75 which is connected by a link 76 with the lower end of the lever 71, whereby the latter is vibrated or rocked in the desired manner. The slide 62 is connected by a link 77 with the upper end of the lever 71, so that said slide is reciprocated in the desired manner, by the rocking motion communicated to the shaft 73 by the reciprocating pitman 28, when the machine is in operation; and, because of the rod 70 which connects the lever 71 with the arm 69, the rocking of the shaft 73 causes the arm 67 to move up and down, so that the nozzle 64 rises and sucks down the front edge portion of the lowermost blank at a time when the slide 62 is in such a position that the edge of the blank passes down against the side of the roll 60, and is then drawn in between the two feed rolls 60 and 61 as the slide 62 moves a little farther toward the table 63, whereby the said suction nozzle serves to draw the edge portion of the blank down into position to be seized by the said feed rolls. The blank is fed through the rolls 60 and 61 across the top of the inclined table 78, which latter is carried by the slide or reciprocating carriage 62, and the blank is thereby delivered under the guides or guards 79 to the feed rolls 80 and 81, the latter being rotated by the sprocket wheel 41 previously mentioned. By means of screw adjusting devices 82, of any suitable character, the guards or guides 79 and the roll 80 can be raised and lowered to regulate the feeding action of the blanks. Thus the blanks are maintained in a stack in the hopper, and are fed from the bottom of the stack, one by one, by the cooperation of the rolls 60 and 61 and the suction nozzle 64, it being understood that the movements of these different instrumentalities constituting the feeding means are so timed, by properly proportioning the different elements, that the blanks are pulled from the bottom of the stack and fed forward at the desired speed, and as fast as is necessary and proper, it being understood that each blank must be folded and equipped with the bail-shaped wire handle 83, as shown in Fig. 21, and discharged as the finished product from the mechanism for doing this, before the next blank can be fed into position to be similarly folded and reduced to the form desired for the ice-cream-pail or other receptacle.

The mechanism for folding the blanks, so that each blank assumes the form desired for the ice-cream pail or other receptacle is as follows: A plate 84 is suspended from the bracket castings 85 by links 86, which links are held against lateral motion by the links 87 which are also pivoted on said brackets. Said plate is provided with a central opening 88 and on its under side with ledges 89 below which the blank is fed from the rolls 80 and 81, as shown in Fig. 19, the feeding movement being of such extent that each blank is stopped with its flaps 58 directly below said ledges 89, and with its center or bottom section 52 directly and accurately over the top of the tapered form 38 upon which each ice-cream pail or other receptacle is made. The forward feeding motion of the blank is interrupted by the stops 90 which are provided with slots 91 to engage the bolts 92 by which they are secured to the side frames of the machine, whereby said stops engage the edges of the flaps 58 of each blank, thus holding the blank in the desired position for folding. Brackets 93 and 94 are secured by screws or bolts 95 to the top of the plate 84, as shown more clearly in Fig. 20, the brackets 93 being provided with sheet metal plates forming folders 96, the brackets 94 having similar folders 97. As the blank is forced upward through the opening 88 by the vertically movable form 38, the side sections 53 are bent downward by the edges of the opening 88, and the end sections 54 are bent downward by the edges of the ledges 89, so that the corner or flap sections 55 and 56 are folded together, and as the blank is forced still farther upward, the two flaps 55 at opposite ends of the blank are forced around with the adjacent flaps 56 against the end sections 54, and the other corner or flap sections 55 and 56 are folded in the same manner, so that two triangular flaps are formed at each end of the receptacle, each flap being of double thickness (the sections 55 and 56 constituting each double thickness) and one flap of double thickness is caused to partially overlap the other flap of double thickness at each end of the receptacle, so that the sections 55 and the sections 54 combine to form the outer surface at each end of the receptacle, while the sections 53 form the side surface of the receptacle. At such a time the flaps 57, 58 and 59 hang downward, as shown in the drawings. The folders 96 and 97, it will be understood, are so bent or shaped that they fold one section 55 and its attached section 56 inward a little ahead of the other sections 55 and 56, so that the two triangular flaps of double thickness are lapped one upon the other at 98 at each end of the receptacle.

The mechanism for cutting off a length of wire for each receptacle, and for bending the length of wire to form the bale-shaped handle, and for inserting the ends of the handle through the lapped portions 98 of the receptacle, is constructed and operated as follows: The form 38 upon which the receptacles are shaped, which is in the nature of a plunger head on the upper end of the post 36, is hollow and contains a pair of pivoted anvils or clinch blocks 99, which are pivoted at 100 upon the form, at opposite ends of the latter, so that these clinch blocks or anvils are adapted to move toward and away from each other about their pivots, in a substantially horizontal plane, thereby to clinch the ends of the wire handle (see Fig. 13). For the operation of the said clinch blocks or anvils 99, a cam 101 is provided between the two anvils, the latter being connected together by a coil spring 102 which tends to draw the two anvils toward each other, thus allowing the two anvils to assume the position shown in dotted lines in Fig. 13 when the cam 101 assumes the position also shown in dotted lines in this figure of the drawings. Said cam 101 is mounted upon the upper end of the lever 103, which latter is pivoted at 104 to the lower portion of the post 36, in the chamber 105 formed in said post. The short lower arm 106 of said lever 103 is connected by a link 107 with the arm 108, which latter is rigid with the arm 19 previously described. A coil spring 109 connects a bracket or pin 110 on the post 36 with the pin 111 on the upper portion of the link 107, whereby said spring tends normally to keep the lever 103 in the position shown in Fig. 19, and to keep the roll 18 in engagement with the cam 17, whereby the rotation of the shaft 10 cooperates with said spring to throw the lever 103 back and forth within the post and the form 38 at the upper end thereof, thereby operating the anvils 99 in the desired manner, and at the proper time clinching the inner ends of the wire handle. The wire for the handles is fed through feed mechanism 112, of any suitable character, and into the tube 113, which is supported by the casting or table 4 previously described. Said table 4 is provided with longitudinally arranged and suitably spaced guides 114, 115, 116 and 117, of any suitable character, the guide 114 containing the tube 113 through which the wire is fed into a position to be cut off and bent into the desired shape. A slide 118 is mounted to reciprocate between the guides 114 and 115, and a similar slide 119 is mounted to reciprocate between the guides 116 and 117, these two slides being operated by links 120 which are pivoted to the outer ends of the slides. These links 120 are connected to arms 121 on the rock shaft 122, which latter is mounted in suitable bearings 123 on the body frame of the machine, so that this rock shaft 122 extends transversely below the table 4, with the arms 121 extending upwardly and outwardly therefrom. The said rock shaft 122 is also provided with a crank arm 124 to which the previously described pitman 24 is connected, whereby the reciprocation of this pitman, in the manner previously explained, when the shaft 10 is rotated, causes the shaft 122 to oscillate or rock back and forth, and to thereby reciprocate the slides 118 and 119 in their respective guideways. The wire is fed through guide blocks 125, 126 and 127, which blocks are arranged in line with each other transversely of the machine, directly across the inner ends of the guides 115 and 116, in position to receive the wire from the tube 113, it being observed that the blocks 125 and 127 have passages therein which curve or bend the wire. These guide blocks 125, 126 and 127 have their lower portions provided with slots 128 to receive the wire, and are mounted to move up and down in a housing 129, which latter is rigid with the body frame of the machine. Said guide blocks are yieldingly held down by springs 130 (see Fig. 15), and are raised from this position by the operation of the mechanism which bends the wire. For this purpose, therefore, the slide 118 has its forward portion provided with a bevel portion forming a cam 131, and with a similar cam 132, the first cam being in position to raise the block 125, the second cam being in position to pass under and raise the block 126; and the slide 119 is provided with similar cams 133 and 134, the first for raising the block 127, and the second for assisting in raising the block 126, whereby the three guide blocks are raised in unison when the two slides move forward. The slide 118 has a bar or shim 135 applied to its outer edge and keyed thereto by a key 136, so that the forward end of this bar or shim is a little in advance of the cam 131 previously described; and the forward end of this bar or shim 135 is formed to cut or sever the wire at the end of the tube 113, so that the length of wire which has been fed into the guide blocks 125, 126 and 127 is then free to be bent into bail shape to form the handle for the receptacle. The slide 118 is provided with a pivoted finger or folder 137, the forward end portion 138 of which engages the wire to bend the same around toward the receptacle (see Fig. 12), and the slide 119 has a similar pivoted shoulder 139, provided with a forward end portion 140 which bends the wire around at the other side of the receptacle. The bar or shim 135 not only cuts off the wire, but also bends the short end portion 141 or the wire at right angles to the straight length of wire, and a similar bar or shim 142, secured to the slide 119, bends the short end portion 143 of the wire, so that these two portions 141 and 143 are in position to pierce and pass through the folded flaps and end sections of the receptacle, when the side portions 144 of the handle are finally bent around by the two pivoted folders 137 and 139, the guide blocks 125, 126 and 127 having been raised out of the way by the said cams 131 and 132 and 133 and 134, so that clearance is provided for these instrumentalities by which the wire is bent into the desired form; but it will be observed, of course, that the block 126 is not raised until after the side portions 144 of the wire handle are bent around, this block 126 cooperating with the pivoted fingers 137 and 139 to effect the bending of the wire in this manner; but thereafter, as soon as the cams 132 and 134 strike the block 126, the latter is then raised to release the handle which has by this time been fastened to the receptacle, as shown in Fig. 13, so that the receptacle and handle are ready to be pushed upwardly out of the way to make room for the formation of the next receptacle. The cams 131 and 132 are preferably in the form of a plate, such as the one shown in Fig. 17, and the cams 133 and 134 are formed by a similar plate, the two plates being secured to their respective slides by screws, or in any suitable manner. The pivoted folders 137 and 139 are normally held in the positions which they occupy in Fig. 12, by pins 145 which bear against the arms 146 of said folders, said pins being yieldingly held in their normal positions by the springs 147 applied to their inner ends, so that each pin is movable in its socket in a direction toward and away from the receptacle or icecream pail. However, as soon as the arms 146 strike the guide block 126, the said folders 137 and 139 are then forced toward each other, thereby to force the end portions 141 of the handle through the material of the receptacle, as shown in Fig. 13, and at such time the anvils 99, as previously described, deflect the end portions 141 backward toward the block 126, and clinch the two ends of the wire upon the inner surfaces of the receptacle. Each folder 137 and 139 is preferably provided on its inner edge with a groove 148 to engage the wire, and it will be understood that the arms 146 of the folders do not engage the wire until after the block 126 is raised by the cams 132 and 134, so that the wire is then carried against the stationary plate 149, and held in this position by the arms 146, as shown in Fig. 13, this being the final position of the handle. It will also be seen that the forward ends of the slides 118 and 119 are provided with cams 150 which slide forward under the wire, in advance of the latter, above the folders 96 and 97 previously described, thereby to press the sections 55 tightly against the sections 54 of the receptacle, so that the lap 98 at each end of the receptacle will be held in condition to receive the ends of the wire handle. When the slides 118 and 119 are retracted, the spring-pressed pins 145 return the folders 137 and 139 to normal position, as shown in Fig. 12, so that the end portions 138 and 140 of said folders are in position to properly engage the end portions of the wire handle when the two slides are again moved forward toward the next receptacle. Screws 151 are provided between the guides 115 and 116 so that the latter can be crowded further apart, thus keeing the slides 118 and 119 tight in their guideways—that is to say, tight enough to prevent improper looseness, but not tight enough to interfere with the free reciprocation of said slides. It will be understood, of course, that the various instrumentalities are so timed in their operations that the slides 118 and 119 move forward at the proper time, after the blank has been folded on the form, and while the receptacle is being held in position to receive the handle. The three guide blocks are preferably beveled at 152 to engage the cams by which they are raised into position to allow the wire handle to escape from the slots in the bottom of said blocks.

Means are provided for disposing of the finished receptacles, by gradually feeding them upwardly in the hopper-like structure formed by the guides 153 mounted directly above the position in which the blanks are folded. A transverse rock shaft 154 is mounted on brackets 155 secured to the castings 85 previously described. Said rock shaft 154 is provided with arms 156, and the castings 85 have vertical guides 157 formed therein for the slides 158 which move up and down in said guides. Each guide 158 is provided with a downwardly extending finger 159 which is pivoted on the upper end of the slide at 160, so that the lower ends of these fingers, which are hook-shaped to engage below the edges of the receptacle, are adapted to swing toward and away from each other. The arms 156 are connected by links 161 with the shorter links 162, and the latter have their ends pivoted at 163 upon the elbow portions of the fingers 159, somewhat loosely, so that the up and down movement of the arms 156 is communicated through the fingers 159 to the slides 158, with the result that the said fingers are automatically swung toward and away from each other while moving up and down; for when the slides 158 move downward, the downward pressure of the links 161 and 162 causes the lower ends of the fingers 159 to swing away from each other, and when the said links move upward, the lower ends of said fingers then swing toward each other to engage the lower edges of the receptacle—that is to say, to engage the lower edges (the receptacle being at that time inverted or upside down) of the lapped portions 98 at each end of the receptacle. The rock shaft 154 is connected by an arm 164 with the upper end of the connecting member 33, which latter, as previously explained, is moved up and down by the lever 31, a spring 165 being provided to pull downwardly on the member 33, whereby the deired oscillation or rocking motion of the rock shaft 154 is ensured, so that the fingers 159 are operated automatically at the proper time and in the manner described, thereby to lift each completed receptacle from the form 38, causing the receptacles in nested condition to rise in column form in the guides 153 and gradually topple over at the upper end thereof, any suitable means being employed for catching the finished receptacles. With this arrangement, it is desirable that the lowermost receptacles in the column be held frictionally against dropping downward, when released by the fingers 159, and for this purpose plates 166 are arranged to bear against the opposite sides of the gradually forming column of the receptacles, at the lower end thereof, these plates being yieldingly held against the receptacles by spring devices 167 of any suitable, known or approved character. In this way, each receptacle when finished is automatically raised from the top of the form, so that it becomes the lowermost receptacle of the gradually or slowly forming column or stack of nested receptacles, thus leaving clearance below for the operations necessary for the folding of the next blank into receptacle form.

From the foregoing it will be seen that the entire machine is automatic, in this respect: that the blanks are placed in the hopper 51, and are then automatically fed to the mechanism which does the folding, so that each blank is automatically reduced to the form necessary for the receptacle; and, as explained, the wire for the bail-shaped handles is automatically fed into position to be cut off and folded into the desired shape, and the handles are automatically attached to the receptacles; and in this way the supplying of blanks and wire to the machine results in the automatic discharge of the finished ice-cream pails or other receptacles from the upper ends of the guides 153, in the manner explained. The feed mechanism 112 is timed in its operations, of course, so that the wire will be fed into position at the right time, and said mechanism, as shown, is operated by a shaft 168 which extends downwardly to the bevel gearing 169 which is operated by the shaft 10 previously described, so that the wire feeding mechanism is operated from this shaft when the belt pulley 6 is rotated.

The slides 118 and 119 and their guideways, are covered by a plate 170 secured in place by bolts or screws 171 inserted in the holes 172 formed in the outermost guides, whereby the mechanism is all held firmly in place. At the same time, however, by removing the cover plate 170, ready access may be obtained to the said mechanism, and the different parts can thus be removed for repair or substitution, and when it is desirable or necessary to clean the machine.

As previously stated, the slots in the blocks 125 and 127 are curved, so that the wire is bent in the manner shown in Fig. 6, and in this way the side portions 144 of the handle are prevented from bowing or bulging outwardly when bent around for insertion in the receptacle, the curvature given these portions by the blocks 125 and 127 being sufficient to counteract the bending or curving action which would be produced by the forward movement of the folders 137 and 139, whereby these portions 144 of the handle are straight after the handle is attached.

As explained, therefore, the receptacles are formed upside down, and each finished receptacle is prevented from falling back while the folding instrumentalities and the wiring mechanism are being retracted for the next blank. The pails are nested upside down, and the column is increased by the addition of pails at the bottom of the column, so that the top of the column finally rises to a height where it will topple over in the manner described, because of the form of the guiding means 153, the latter being bent over in the manner shown, so that the column of pails will gradually curve and topple over at its upper end. The pail is formed, therefore, by upward movement of the blank in the direction opposed to the force of gravity, so that the center of the blank must be lifted, and in this way the blank does not rise farther than is necessary or desirable, as gravity keeps it down against the plunger, and the folding action is definite and certain. The blanks are fed with the outer surface, or the surface which forms the outside of the pail, facing upward, and thus any printing previously applied on the blanks will be in plain view, and the inner surface of the blank will face downward.

Figure 1:
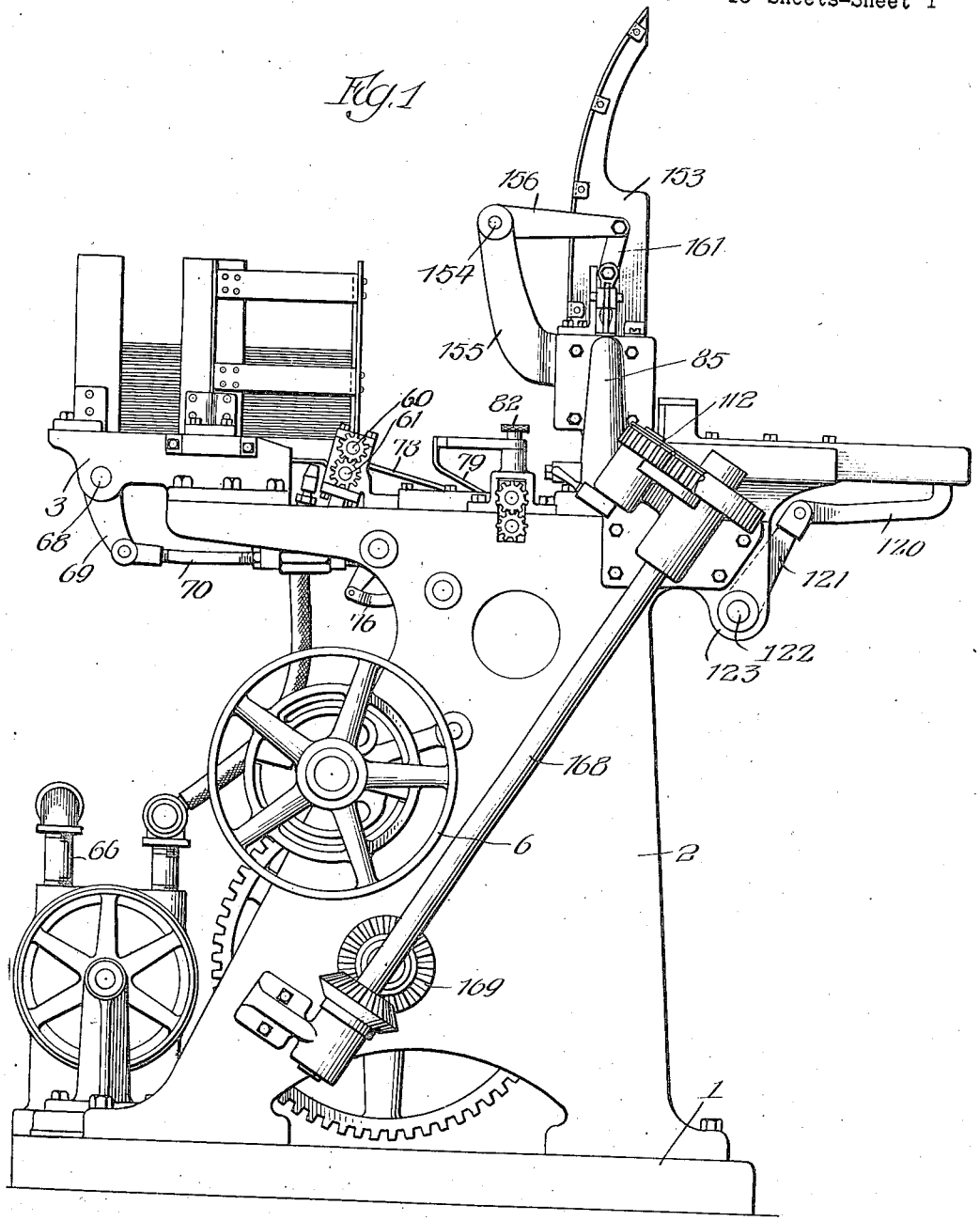
Fig. 1 is a side elevation of an ice-cream pail machine embodying the principles of the invention.

It will be seen that the bail forming the wire handle is formed and applied to the receptacle in a horizontally disposed plane, so that the handle at such time projects laterally from the side of the receptacle. This formation of the handle and the application thereof to the receptacle takes place in a horizontally disposed plane above the initial plane of the blank—that is to say, above the horizontally disposed plane in which the blank is fed into position to be folded. The instrumentalities for feeding the blanks are, therefore, disposed in position and so arranged that the blanks are fed along in a horizontally disposed plane below the plane in which the wire handles are formed and applied to the receptacles, and the arrangement is such that the blanks are fed forward in one direction while the handles are formed and applied in the opposite direction. The blanks are fed toward the forming mechanism from the hopper, and the mechanism for forming the wire handles is located at the opposite side of the instrumentalities for folding the blank, so that the blanks feed forward from one direction while the handles are moved into position and applied to the receptacles in the opposite direction— that is to say, as shown in Fig. 1 of the drawings, for example, the blanks are fed along to the right, while the handles are formed and applied by movement thereof to the left. Thus each blank assumes its initial position in the plane in which it is fed to the forming mechanism, or the folding instrumentalities, and is then moved upward a distance for the folding operation and the result is that the formed receptacle receives this wire bail or handle at a point above, the horizontal plane in which the handle is formed being some distance above the initial plane or position first occupied by the blank when fed into position for the folding operation. Thus the means for feeding the blanks and the means for forming and applying the handles are arranged in operative relation to produce the desired results, in the manner explained, so that the machine may run continuously and turn out wire handled receptacles from the stream of blanks fed to the forming instrumentalities in one direction, and from the wire feeding to the handle forming mechanism in another direction. In other words, it will be observed that the wire is fed to the handle forming mechanism at right angles to the direction of the feeding movement of the blanks, but the direction in which the handle is formed and applied to the receptacle is parallel with the direction of the feeding movement of the blanks, but in a plane above the feeding plane of the blanks.

In a divisional application Serial No. 493,573 filed August 19, 1921 there are claims for the feed mechanism and devices shown and described herein for feeding the blanks to the mechanism for folding each blank and applying the handles to the pails.

What I claim as my invention is:—

1. In a machine for folding blanks and inserting wire bails therein to form receptacles having handles, the combination of means to support the blank in a horizontally disposed plane, with the inside surface of the blank facing downward, instrumentalities above and below said plane for automatically folding the blank, thereby to form the receptacle upside down by upward movement thereof, mechanism disposed in position for automatically applying the wire bail horizontally to form a handle which serves also to retain the blank in the folded condition thereof, so that the handle formed by the bail is applied in a horizontally disposed plane above the said plane of the blank, and means to prevent each finished receptacle from falling back when said instrumentalities and mechanism are retracted for the insertion of the next blank.

2. A structure as specified in claim 1, in combination with means to automatically feed the wire for the bail, said mechanism comprising means to cut off a length of said wire, means for bending the length to form the bail, means for inserting the ends of the bail through the folded portions of the blank which form the side of the receptacle, and means for bending the inserted ends of the wire.

3. A structure as specified in claim 1, said instrumentalities including devices to fold a double thickness of the blank upon another double thickness, so that one double thickness overlaps the other double thickness, at each end of the receptacle, and said mechanism being operative to insert the wire through these overlapping portions and to bend the ends of the handle upon the opposite inner surfaces of the receptacle.

4. A structure as specified in claim 1, said mechanism being adapted to bend the ends of the wire upon the opposite inner surfaces of the receptacle.

5. A structure as specified in claim 1, said mechanism comprising means to cut the wire, means to bend the ends of the wire, and means to insert the ends through the walls of the receptacle.

6. A structure as specified in claim 1, said instrumentalities comprising a plate with an opening therein, a plunger shaped to form the receptacle, means for moving the plunger upwardly through said opening, brackets on said plate, and folding means on said brackets, said folding means comprising sections of sheet metal bent into position to engage different sections of the blank, thereby to fold a double thickness of the blank upon another double thickness, at each end of the receptacle, and said means being operative to insert the wire through overlapping thicknesses at each end of the receptacle, and through the end walls of the latter, so that each end of the wire is inserted through five superimposed thicknesses of the sheet material.

7. A structure as specified in claim 1, said mechanism comprising a pair of reciprocating slides provided with pivoted elements to engage and bend the wire, and having means below the plane of said elements to engage the folded portions of the blank, at opposite ends of the latter, and said folding instrumentalities comprising a plunger shaped to form the receptacle, said plunger having pivoted anvils therein to bend and clinch the ends of the wire, and means to automatically operate said anvils.

8. A structure as specified in claim 1, said folding instrumentalities comprising a plunger shaped to form the receptacle, pivoted anvils in said plunger to bend and clinch the ends of the wire, and means to automatically operate said anvils.

9. A structure as specified in claim 1, said mechanism comprising vertically reciprocating blocks to receive the straight length of wire, a pair of slides provided with means to raise two of the blocks to permit folding of the wire to bring the ends thereof into position for insertion in the receptacle, and having means for raising the third block to permit the advancement of the handle into position for attachment to the receptacle, pivoted elements on said slides to bend the wire toward the receptacle, and means to clinch the ends of the wire within the receptacle.

10. A structure as specified in claim 1, said mechanism comprising a pair of slides provided with means to first bend the end portions of the wire at right angles thereto, means for then bending the wire toward the receptacle to bring said right angle end portions into position for insertion through the walls of the receptacle, and for inserting said end portions by the final movement of said slides, and means to automatically clinch the ends of the wire on the inner surface of the receptacle.

11. A structure as specified in claim 1, in combination with means for automatically and successively feeding the blanks in a plane below the plane of the bail and into position to be folded.

12. A structure as specified in claim 1, said folding instrumentalities comprising a vertically reciprocating plunger shaped to form the receptacle, a plate having an opening therein for said plunger, folders on said plate, whereby the blank is forced upwardly by the plunger through said opening, in combination with devices in said plunger to clinch the ends of the wire handle, and cam mechanism connected to operate said plunger and to automatically control said devices.

13. A structure as specified in claim 1, in combination with pivoted fingers for automatically disengaging the finished receptacle from the folding instrumentalities, and for supporting the finished receptacles in a vertical column in nested condition, so that each receptacle when finished is added to the bottom of said column, and means for causing the top of said column to topple over.

14. In mechanism for bending a length of wire and inserting the same in a receptacle, the combination of a pair of slides provided with means for bending the extreme end portions of the wire at right angles thereto, pivoted elements on said slides to bend the wire to form the bail-shaped handles, stationary means to engage and actuate said elements for inserting said right angle portions through the walls of the receptacle, vertically reciprocating blocks for holding the wire during the first and second folding operations thereof, means on said slides to raise the two outer blocks to permit the second folding operation of the wire, and means on said slides to raise the middle block to permit the advancement of the handle into position for insertion of the ends of the wire through the walls of the receptacle, together with means cooperating with said pivoted elements to clinch the ends of the wire on the inner surface of the receptacle.

15. A structure as specified in claim 14, in combination with means forming a stop to engage the middle portion of the handle to limit the movement thereof toward the receptacle, and to cause the final movement of said pivoted elements toward each other.

16. A structure as specified in claim 14, in combination with spring means for holding said pivoted elements in normal position, said stationary means comprising a plate forming a stop to limit the forward motion of the handle and to cause the final pivotal motion of said elements toward each other, said spring means yielding to permit said final motion.

17. A structure as specified in claim 14, said slides being disposed in a horizontal plane, so that the folding and bending of the wire takes place in a horizontal plane, in combination with means for feeding the blank forward in a horizontal plane below the said plane of the wire handle.

18. In a machine for folding a blank to form a receptacle, and for discharging the finished receptacles upwardly, the combination of a reciprocating plunger shaped to form the receptacle upside down, folding instrumentalities co-operating with said plunger to fold the different sections of the blank into position, and means for operating said plunger, in combination with means for applying a wire bail horizontally to form a handle for the receptacle, in a plane above the initial plane of the blank, devices in said plunger to clinch the ends of said wire, means below the plunger for automatically operating said devices, and means to prevent each finished receptacle from falling back when said plunger is retracted for the next blank.

19. A structure as specified in claim 18, said devices comprising a pair of pivoted anvils to engage the ends of the wire, and the means for operating said devices comprising a cam movable between said anvils to spread them apart, a bell crank lever upon which said cam is mounted, and a cam connected to operate said bell crank lever.

20. A structure as specified in claim 18, said devices comprising a pair of movable anvils to engage the ends of the wire, and said means for operating said devices comprising a cam for engaging said means, together with power-operated connections for actuating said cam to force said means engaged thereby against the inner surface of the receptacle.

21. In a machine for making receptacles from sheet material, a pair of feed rolls for feeding the sheet material, said rolls holding the sheet between them in a horizontally disposed plane, means for reciprocating said rolls horizontally, so that said rolls move bodily in a direction at right angles to the length thereof, means to assist in delivering the sheet material to said rolls, and supporting means to finally raise the sheet material, in combination with means to fold the sheet material to form two-ply flaps for two sides of the receptacle, and means above the plane of feeding movement of the sheet for applying a wire bail to the receptacle, operable to form the handle thus provided in a horizontally disposed plane above the sheet feeding plane of said rolls.

22. In a machine for making receptacles from sheet material, the combination of means for supplying the sheet material, feed rolls to receive the sheet material from said means, a movable suction nozzle for pulling the edge portion of the sheet material downward into position to be engaged by said feed rolls, and guiding and supporting means to receive the sheet from said rolls, in combination with means for receiving and folding the sheet material to form two-ply flaps for two sides of the receptacle, and means above the plane of feeding movement of the sheet for horizontally applying a wire bail to the receptacle, said feed rolls and nozzle being operable to feed the sheet in a plane below the plane of said bail, and in a direction opposite to the direction in which the bail approaches the receptacle.

23. The improved machine for making ice-cream pails or similar receptacles, by automatically folding the sheet material to form the receptacle upside down, and automatically applying a wire bail horizontally to each receptacle, in a plane above the initial plane of the blank, and means to prevent the finished receptacle from falling back while the next one is being made, substantially as shown and described.

24. In a machine for folding blanks and inserting wire bails therein to form receptacles having handles, the combination of instrumentalities for automatically folding the blank, and mechanism for automatically applying the wire bail to form a handle which serves also to retain the blank in the folded condition thereof, said folding instrumentalities comprising a vertically reciprocating plunger shaped to form the receptacle, a plate having an opening therein for said plunger, folders on said plate, means for supporting the blank below the plate, whereby the blank is forced upwardly by the plunger through said openings, in combination with devices in said plunger to clinch the ends of the wire handle, and cam mechanism connected to operate said plunger and to automatically control said devices.

25. In a machine for folding blanks and inserting wire bails therein to form receptacles having handles, the combination of instrumentalities for automatically folding the blank, and mechanism for automatically applying the wire bail to form a handle which serves also to retain the blank in the folded condition thereof, in combination with pivoted fingers for automatically disengaging the finished receptacle from the folding instrumentalities, and for supporting the finished receptacles in a vertical column in nested condition, so that each receptacle when finished is added to the bottom of said column, and means for causing the top of said column to topple over.

26. In mechanism for bending a length of wire and inserting the same in a receptacle, the combination of a pair of slides provided with means for bending the extreme end portions of the wire at right angles thereto, pivoted elements on said slides to bend the wire to form the bail-shaped handles, and for inserting said right angle portions through the walls of the receptacle, vertically reciprocating blocks for holding the wire during the first and second folding operations thereof, means on said slides to raise the two outer blocks to permit the second folding operation of the wire, and means on said slides to raise the middle block to permit the advancement of the handle into position for insertion of the ends of the wire through the walls of the receptacle, together with means co-operating with said pivoted elements to clinch the ends of the wire on the inner surface of the receptacle.

27. In mechanism for bending a length of wire and inserting the same in a receptacle, the combination of a pair of slides provided with means for bending the extreme end portions of the wire at right angles thereto, pivoted elements on said slides to bend the wire to form the bail-shaped handles, and for inserting said right angle portions through the walls of the receptacle, vertically reciprocating blocks for holding the wire during the first and second folding operations thereof, means on said slides to raise the two outer blocks to permit the second folding operation of the wire, and means on said slides to raise the middle block to permit the advancement of the handle into position for insertion of the ends of the wire through the walls of the receptacle, together with means co-operating with said pivoted elements to clinch the ends of the wire on the inner surface of the receptacle, in combination with means forming a stop to engage the middle portion of the handle to limit the movement thereof toward the receptacle, and to cause the final movement of said pivoted elements toward each other.

28. In mechanism for bending a length of wire and insertingg the same in a receptacle, the combination of a pair of slides provided with means for bending the extreme end portions of the wire at right angles thereto, pivoted elements on said slides to bend the wire to form the bail-shaped handles, and for inserting said right angle portions through the walls of the receptacle, vertically reciprocating blocks for holding the wire during the first and second folding operations thereof, means on said slides to raise the two outer blocks to permit the second folding operation of the wire, and means on said slides to raise the middle block to permit the advancement of the handle into position for insertion of the ends of the wire through the walls of the receptacle, together with means co-operating with said pivoted elements to clinch the ends of the wire on the inner surface of the receptacle, in combination with spring means for holding said pivoted elements in normal position, and a plate forming a stop to limit the forward motion of the handle and to cause the final pivotal motion of said elements toward each other, said spring means yielding to permit said final motion.

29. In a machine for folding a blank to form a receptacle, the combination of a reciprocating plunger shaped to form the receptacle, folding instrumentalities co-operating with said plunger to fold the different sections of the blank into position, and means for operating said plunger, in combination with means for applying a wire bail to form a handle for the receptacle, devices in said plunger to clinch the ends of said wire, and means for automatically operating said devices, said devices comprising a pair of pivoted anvils to engage the ends of the wire, and the means for operating said devices comprising a cam movable between said anvils to spread them apart, a bell crank lever upon which said cam is mounted, and a cam connected to operate said bell crank lever.

30. In a machine for folding a blank to form a receptacle, the combination of a reciprocating plunger shaped to form the receptacle, folding instrumentalities co-operating with said plunger to fold the different sections of the blank into position, and means for operating said plunger, in combination with means for applying a wire bail to form a handle for the receptacle, devices in said plunger to clinch the ends of said wire, and means for automatically operating said devices, said devices comprising a pair of movable anvils to engage the ends of the wire, and said means for operating said devices comprising a cam for engaging said means, together with power-operated connections for actuating said cam to force said means engaged thereby against the inner surface of the receptacle.

31. In a machine for making receptacles, mechanism for providing a supply of blanks and for automatically feeding the blanks in a horizontally disposed plane and into position to be folded, instrumentalities for folding the blanks to provide two-ply flaps at each side of each receptacle, and devices for inserting a wire handle in a plane above said other plane and through the flaps of each receptacle.

32. A structure as specified in claim 31, said means for feeding the blanks comprising rolls disposed in position for feeding the blanks horizontally in said upper plane and into folding position, with certain portions of the blank thereby disposed in position to be folded to produce said two-ply flaps for the receptacle.

33. A structure as specified in claim 31, said instrumentalities being operative to form the receptacle upside down, and means for preventing each finished receptacle from falling back while the next receptacle is being made.

34. In a machine for making receptacles, the combination of means for folding and fastening the blank to form the receptacle upside down, by performing the fastening operation in a plane above the initial plane of the blank, means for holding each finished receptacle against falling back while the next receptacle is being made, so that the receptacles are stacked or nested upside down, and means for causing the top of the stack to gradually topple over.

EDWARD CRAIG.